United States Patent
Van Wolde

(10) Patent No.: US 10,414,592 B2
(45) Date of Patent: Sep. 17, 2019

(54) ROD BELT FOR ROD BELT CONVEYORS OF AGRICULTURAL MACHINES

(71) Applicant: Arnold Jaeger Holding GmbH, Hannover (DE)

(72) Inventor: Harm Jan Van Wolde, TT Huizinge (NL)

(73) Assignee: Arnold Jaeger Holding GmbH, Hannover (DE)

( * ) Notice: Subject to any disclaimer, the term of this patent is extended or adjusted under 35 U.S.C. 154(b) by 0 days.

(21) Appl. No.: 16/048,568

(22) Filed: Jul. 30, 2018

(65) Prior Publication Data

US 2019/0039831 A1 Feb. 7, 2019

(30) Foreign Application Priority Data

Aug. 3, 2017 (EP) .................................... 17001330

(51) Int. Cl.
*B65G 15/52* (2006.01)
*A01D 17/10* (2006.01)
(Continued)

(52) U.S. Cl.
CPC .............. *B65G 15/52* (2013.01); *A01D 17/10* (2013.01); *B65G 15/00* (2013.01); *F16G 3/08* (2013.01); *F16G 3/10* (2013.01); *B65G 2201/02* (2013.01)

(58) Field of Classification Search
CPC ......... B65G 15/50; B65G 15/52; B65G 15/56
(Continued)

(56) References Cited

U.S. PATENT DOCUMENTS 3,015,381 A  1/1962  Mohwinkel et al.
3,622,209 A * 11/1971  Leyden ................ B62D 55/244
                                              198/847
(Continued)

FOREIGN PATENT DOCUMENTS

DE    1834273 U    7/1961
DE    3415524 U1   5/1984
(Continued)

OTHER PUBLICATIONS

European Search Report in Application No. 17001330.4-1017 dated Feb. 8, 2018 with English translation.

*Primary Examiner* — Joseph A Dillon, Jr.
(74) *Attorney, Agent, or Firm* — Collard & Roe, P.C.

(57) ABSTRACT

The present invention relates to a rod belt for rod belt conveyors of agricultural machines comprising rods (5) arranged transverse to the direction of transport and parallel to each other, the rods (5) comprising flattened and perforated attachment areas (5.1) by means of which they lie in contact with elastic belts (2) of high tensile strength revolving parallel to each other and being connected to the belts (2) via rivets or similar attachment means penetrating the attachment area (5.1) and the belt (2), both ends (9) of which belt constituting a joint (8). It is the object of the invention to provide a rod belt of this type having an endless connection of high stability while, at the same time, being easy to disassemble and mount. This task is solved according to the invention in that an auxiliary belt section (7) each is arranged laterally adjacent to the belts (2), the auxiliary belt section bridges the joint (8) between the belt ends (9) whereby the belts (2) and the auxiliary belt sections (7) are interlocked by means of the rods (5).

1 Claim, 2 Drawing Sheets

Figure 3:
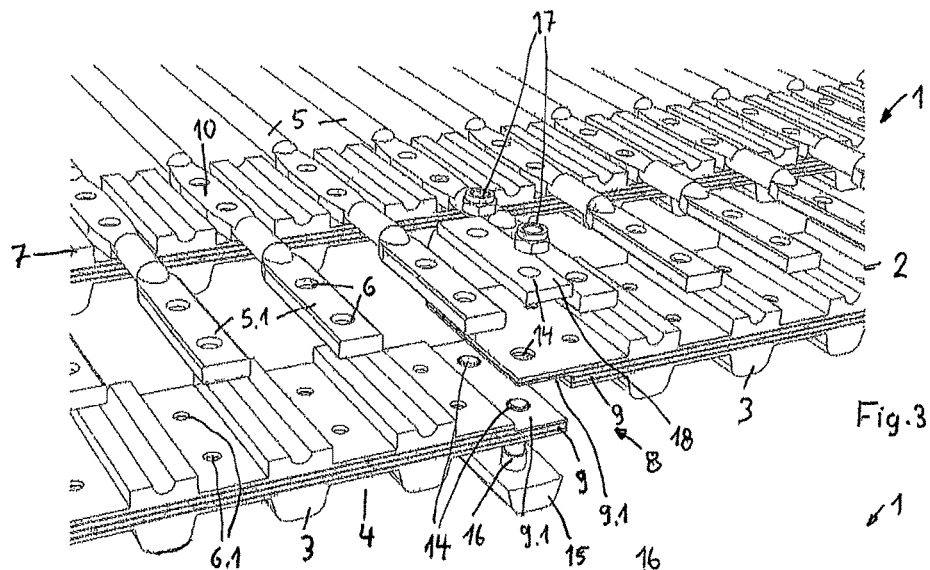

(51) Int. Cl.
*B65G 15/00* (2006.01)
*F16G 3/08* (2006.01)
*F16G 3/10* (2006.01)

(58) Field of Classification Search
USPC .......................................... 198/847, 848, 849
See application file for complete search history.

(56) References Cited

U.S. PATENT DOCUMENTS

| | | | | |
|---|---|---|---|---|
| 3,976,192 | A * | 8/1976 | Muller | B65G 15/52 |
| | | | | 198/835 |
| 4,558,492 | A * | 12/1985 | Hite | F16G 3/02 |
| | | | | 198/847 |
| 4,724,909 | A * | 2/1988 | Link | A01D 17/10 |
| | | | | 171/126 |
| 4,815,587 | A * | 3/1989 | Musil | B65G 15/52 |
| | | | | 198/728 |
| 5,099,548 | A * | 3/1992 | Loosli | B65G 15/52 |
| | | | | 198/844.2 |
| 5,176,248 | A * | 1/1993 | Allen | A01D 17/10 |
| | | | | 171/126 |
| 5,360,103 | A * | 11/1994 | Loosli | B65G 15/30 |
| | | | | 198/844.2 |
| 5,480,352 | A * | 1/1996 | Luscombe | A01D 17/10 |
| | | | | 198/731 |
| 5,692,598 | A | 12/1997 | Röhrs | |
| 5,738,223 | A * | 4/1998 | Rohrs | A01D 17/10 |
| | | | | 198/848 |
| 9,033,139 | B2 * | 5/2015 | Jager | B65G 15/48 |
| | | | | 198/850 |
| 2005/0211532 | A1 * | 9/2005 | Webster | B65G 15/52 |
| | | | | 198/844.2 |
| 2012/0186949 | A1 * | 7/2012 | Gentz | A01D 61/008 |
| | | | | 198/817 |
| 2014/0367229 | A1 * | 12/2014 | Mulder | A01D 17/10 |
| | | | | 198/848 |
| 2014/0367230 | A1 * | 12/2014 | Jager | B65G 15/48 |
| | | | | 198/850 |
| 2015/0076040 | A1 | 3/2015 | Dettmer et al. | |
| 2017/0121118 | A1 * | 5/2017 | Oord | B65G 17/12 |
| 2018/0194564 | A1 * | 7/2018 | Schneider | B65G 17/12 |

FOREIGN PATENT DOCUMENTS

| | | |
|---|---|---|
| DE | 29517673 U1 | 1/1996 |
| DE | 19520927 A1 | 12/1996 |
| EP | 2845459 A1 | 3/2015 |
| WO | 2016068296 A1 | 5/2016 |

* cited by examiner

ROD BELT FOR ROD BELT CONVEYORS OF AGRICULTURAL MACHINES

CROSS REFERENCE TO RELATED APPLICATIONS

Applicant claims priority under 35 U.S.C. § 119 of European Application No. 17001330.4 filed on Aug. 3, 2017, the disclosure of which is incorporated by reference.

The present invention relates to a rod belt for rod belt conveyors of agricultural machines.

Rod belts of this kind have been known in the art for quite a while as can be seen, for example, from the publications Art DE 1834273 U, DE 29517673 U1 and DE 19520927 A1. In these rod belts the length of the attachment areas is essentially equal to the width of the belts. The rods are attached to the belts by rivets or similar means of attachment. To that end the attachment areas of the rods are provided with corresponding holes which are aligned with holes in the belts.

In order to be usable, the rods must be made endless. In the state of the art this happens mechanically, for example, by means of locks, or the rods are overlapped at the joints and vulcanized to be endless or wound endless in total. The two last-mentioned connections have a long life-cycle but also the disadvantage that belts made endless this way are difficult to mount and disassemble since this requires disassembly of the drives.

Thus, it is the object of the present invention to provide a rod belt of this type having an endless connection of high stability while, at the same time, being disassembled and mounted easily.

According to the invention, this task is solved by means of a rod belt exhibiting the features of the present invention.

The auxiliary belt sections arranged laterally adjacent to the belts bridge the belt ends whereby the belts and the auxiliary belt sections are interlocked via the rods of the rod belts. Thus the auxiliary belt sections form a bypass via which the tensile forces are guided to bypass the joint of the belt ends. While, in the state of the art rod belts, the load and the tensile forces are carried solely by the endless belts, now, the load and the tensile forces are carried by the auxiliary belt sections. This means that, in principle, the rod ends can stay loose, i.e. in regard of the transmission of power they do not have to be connected at all. For functional and esthetic reasons, however, such a loose joint is to be avoided. Since the belts have to transmit no or only very small tensile forces the belt ends can be connected in a simple manner, e.g. by means of a so-called single pitch overlap. If so desired, the belts may be used additionally for transmitting tensile forces. In this case the overlap region of the belt ends must be chosen larger or a metal belt lock is to be mounted in the known way.

The endless connection of a rod belt according to the invention has a long durability and is easy to mount and disassemble respectively.

Figure 2:
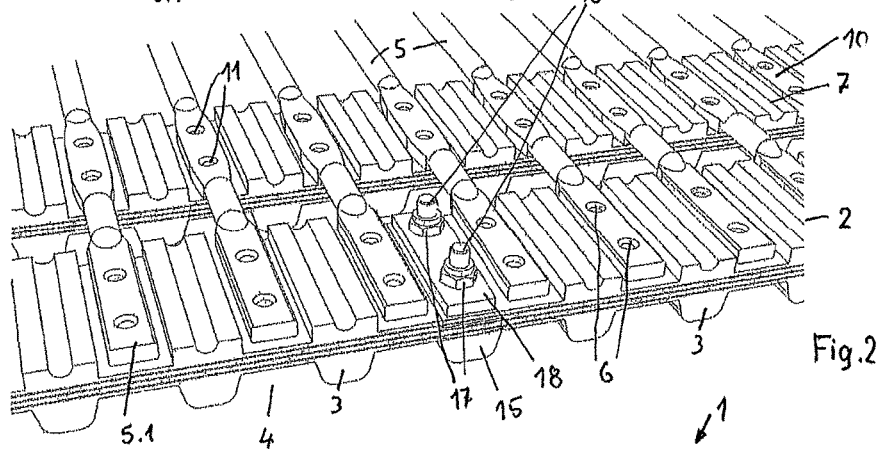
Figure 1:
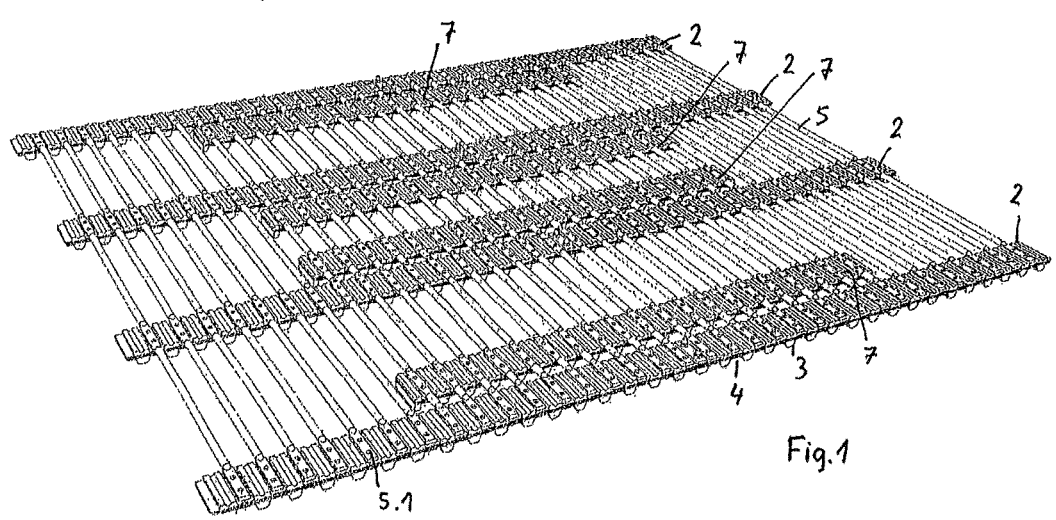
Figure 4:
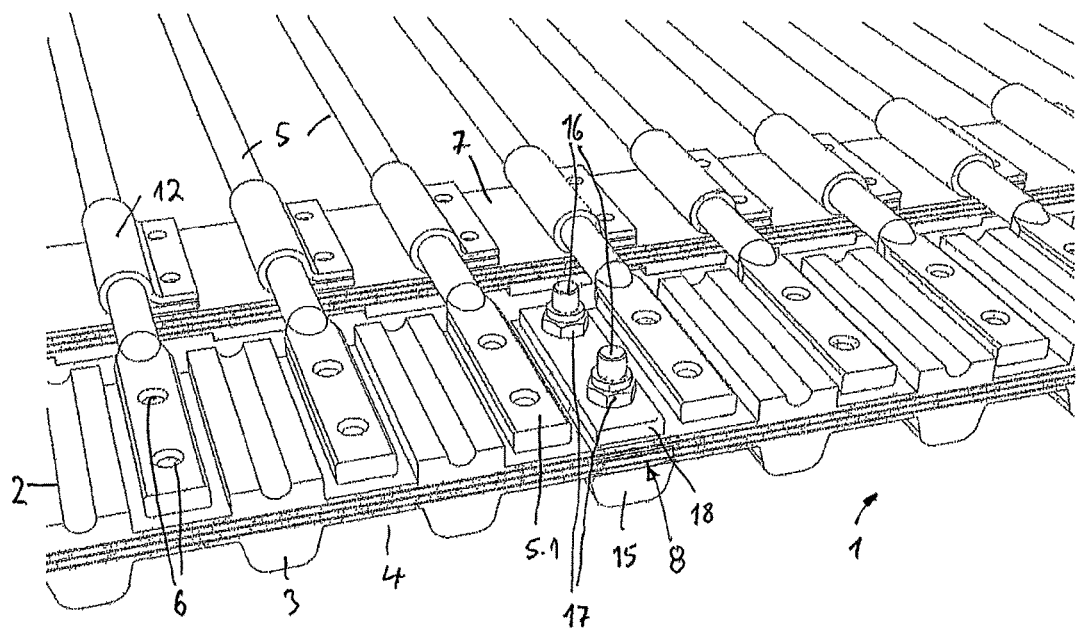
Figure 5:
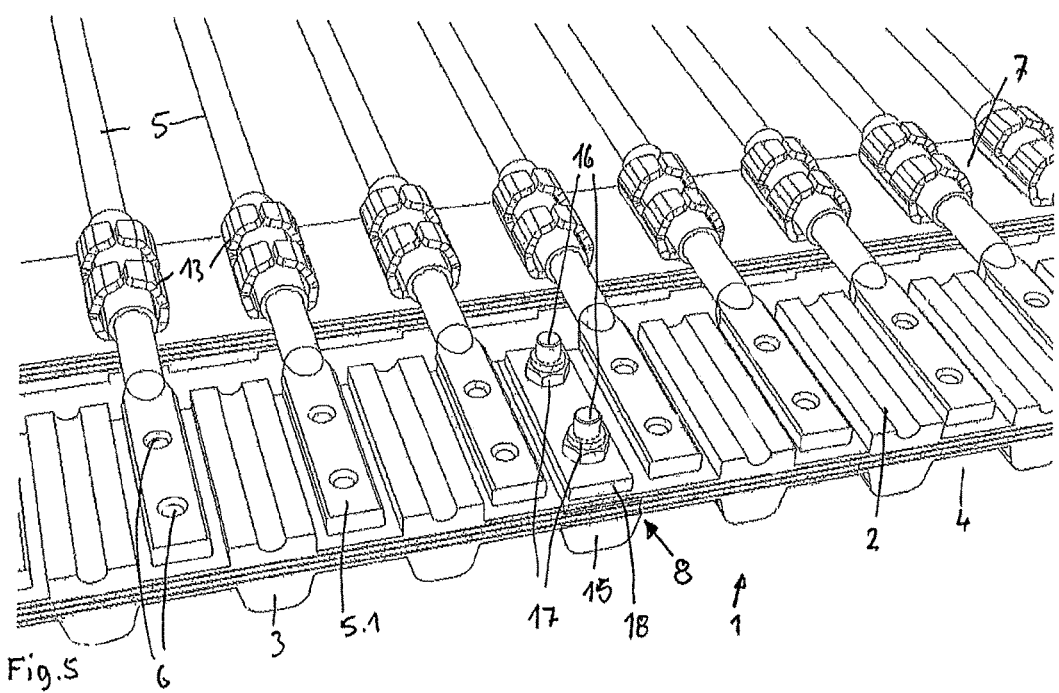

The invention is subsequently illustrated further by means of embodiment examples. The accompanying drawing shows in:

FIG. 1 a perspective view when seen obliquely from above on a region of a rod belt in the area of the endless connections in a first embodiment of the invention, FIG. 2 an enlarged section A according to FIG. 1, FIG. 3 a representation according to FIG. 2 prior to the process of making the belt endless, FIG. 4 a representation according to FIG. 2 in a second embodiment of the invention, and FIG. 5 a representation according to FIG. 2 in a third embodiment of the invention.

The rod belt 1 shown in the drawing comprises four belts 2 arranged in parallel to each other. In this embodiment example, the belts 2 are designed as cam belts and may be made e.g. from rubber reinforced by fabric inlays.

At the bottom side of the belts 2 cams 3 are provided which are spaced apart by a pre-conditioned pitch. These cams 3 serve as the positive drive of the rod belt 1. To that end, drive means of drive wheels (not shown) engage in gaps 4 arrange between the cams 3. Such arrangements are known in the state of the art and require no further illustration.

The distance between the belts 2 is adjusted by rods 5 running transverse to the direction of transport of the rod belt 1 and parallel to each other the ends of which are connected to the belts 2. To that end the rods 5 are provided with flattened end regions 5.1, manufactured from round rods by forging, lying in contact with the belts 2. The end regions 5.1 comprise two spaced apart holes 6 which are aligned with like holes 6.1 in the belts 2. The aligned holes 6 and 6.1 receive rivets (not shown) by means of which the rods 5 are attached to the belts 2.

Arranged laterally adjacent to each of the belts 2 is always an auxiliary belt section 7. In the embodiment example according to FIGS. 1 through 3, the auxiliary belt sections 7 have the same construction as the belts 2. However, they may be designed differently (see, e.g., FIGS. 4 and 5). The crucial point is that they are able to transmit tensile forces.

The auxiliary belt sections 7 bridge the joint 8 between the ends 9 of the belts 2. The belts 2 and the auxiliary belt sections 7 are interlocked via the rods 5. To that end the rods 5 comprise further flattened attachment areas 10 which are in contact with the auxiliary belt sections 7. These end regions 10 comprise two spaced apart holes 11 for attachment means (not shown), such as rivets, penetrating the flattened end regions 10 as well as the auxiliary belt sections 7 in the mounted state.

Alternatively, the rods 5 may be affixed to the auxiliary belt sections 10 in another way, such as e.g. by means of clamps 12, as shown in FIG. 4 or, respectively, by means of brackets 13, as shown in FIG. 5. In the FIGS. 4 and 5 equal or functionally equal components are designated by the same reference numerals as in the embodiment example according to the FIGS. 1 through 3.

The auxiliary belt sections 7 transmit the tensile forces while bypassing the joint 8 of the ends 9 of the belts 2. Because no tensile forces act on the ends 9 of the belts 2 the connection of the two ends 9 can be made simply by means of a so-called single pitch overlap, as can be seen from FIG. 3. To that end, the ends 9 of the belts 2 are terraced in the process of partitioning the cams 3 and the terraced ends 9.1 are placed on top of each other so that they overlap. In both terraced ends 9.1 spaced apart attachment holes 14 are provided which are aligned with each other. To connect the two ends 9 of the belts 2 a loose cam 15 is provided into which two screw bolts 16 are vulcanized at the spacing of the attachment holes 14. In order to create the connection the screw bolts 16 of the loose cam 15 are pushed upwards through the attachment holes 14 in the terraced ends 9.1 and an anchor plate 18 and, subsequently, the connection is completed by screwing on nuts 17 onto the screw bolts 16. With this connection, the loose cam 15 lies in the spacing of the fixed cams 3.

The invention claimed is:

1. Rod belt for rod belt conveyors of agricultural machines comprising rods (5) arranged transverse to the direction of transport and parallel to each other, said rods (5)

comprising flattened and perforated attachment areas (5.1) by means of which they lie in contact with elastic belts (2) of high tensile strength revolving parallel to each other and being connected to said belts (2) via rivets attachment means penetrating said attachment area (5.1) and said belt (2), both ends (9) of which belt constituting a joint (8), wherein an auxiliary belt section (7) is arranged laterally adjacent to said belts (2), said auxiliary belt section by passes said joint (8) between the belt ends (9) whereby said belts (2) and said auxiliary belt sections (7) are interlocked by means of said rods (5).

* * * * *